US006224359B1

(12) United States Patent
Domazet

(10) Patent No.: US 6,224,359 B1
(45) Date of Patent: May 1, 2001

(54) APPARATUS FOR FORMING ADOBE BLOCKS

(76) Inventor: Michael Mirko Domazet, 3 Ardmore Crescent, Richmond Hill, Ontario (CA), L4B 2H7

( * ) Notice: Subject to any disclaimer, the term of this patent is extended or adjusted under 35 U.S.C. 154(b) by 0 days.

(21) Appl. No.: 09/233,727

(22) Filed: Jan. 13, 1999

(30) Foreign Application Priority Data

Jan. 27, 1998 (CA) .................................................. 2182128

(51) Int. Cl.[7] ............................ B29C 43/04; B29C 43/36

(52) U.S. Cl. ............................ 425/62; 425/261; 425/350; 425/361

(58) Field of Search ............................ 425/62, 350, 361, 425/261, DIG. 201

(56) References Cited

U.S. PATENT DOCUMENTS

| | | | |
|---|---|---|---|
| 208,929 * | 10/1878 | Rosewarne | 425/361 |
| 264,398 | 9/1882 | Wright | 425/200 |
| 266,532 | 10/1882 | Ross | 425/361 |
| 435,171 | 8/1890 | Davis et al. | 425/361 |
| 489,136 * | 1/1893 | Westlake | 425/361 |

(List continued on next page.)

FOREIGN PATENT DOCUMENTS

| | | |
|---|---|---|
| 2012959 | 9/1991 | (CA) . |
| 1312438 | 1/1993 | (CA) . |

* cited by examiner

*Primary Examiner*—Robert Davis
(74) *Attorney, Agent, or Firm*—Anthony Asquith & Co.

(57) ABSTRACT

A rotating carrousel having four mould cavities equally spaced at ninety degrees from each other. The moulds are open vertically to the sky and in the opposite direction. The mould cavities are on the same pitch circle from the center of the axis. The rotary table is positively locked at each ninety degree turn. When the table is locked in position each station is in its position. The hopper containing pre-granulated soil is mounted stationary above the number one station. The hopper is fed by a screw conveyor from a hammer mill which breaks up the dug-out soil into a uniform granulate. This is most important for the manufacture of high quality adobe bricks. When the hopper has filled the mould cavity the carousel is turned ninety degrees and the filling process is repeated. At the same time the ram at number two station compresses the soil into a high density adobe block. On a further ninety degree turn both operations are repeated, and at the same time a hydraulically operated ram ejects the completed adobe block. The carousel is mounted on a heavy frame suitable to sustain the hydraulic forces of the compression and ejecting rams.

12 Claims, 4 Drawing Sheets

U.S. PATENT DOCUMENTS

| | | | | |
|---|---|---|---|---|
| 512,431 | | 1/1894 | Chatain et al. | 264/256 |
| 686,370 | | 11/1901 | Volkersen | 425/350 |
| 686,656 | | 11/1901 | Hoban | 425/134 |
| 836,369 | | 11/1906 | Dexter | 29/527.1 |
| 836,547 | | 11/1906 | Walsh | 425/73 |
| 881,815 | | 3/1908 | Merritt | 425/350 |
| 916,084 | | 3/1909 | Withoefft | 249/16 |
| 918,231 | | 4/1909 | Warren | 264/33 |
| 936,798 | | 10/1909 | Mueller | 249/22 |
| 972,036 | | 10/1910 | Sullivan | 264/219 |
| 998,474 | * | 7/1911 | Dessau | 425/361 |
| 1,096,905 | | 5/1914 | Griffith | 425/219 |
| 1,208,398 | | 12/1916 | Stoeser | 264/33 |
| 1,233,241 | | 7/1917 | Irey | 249/99 |
| 1,244,608 | | 10/1917 | Hicks | 249/91 |
| 1,335,071 | | 3/1920 | Mousette | 425/345 |
| 1,413,169 | | 4/1922 | Lawton | 52/306 |
| 1,423,461 | | 7/1922 | Scruby et al. | 249/21 |
| 1,457,090 | | 5/1923 | Sellman | 425/64 |
| 1,475,570 | | 11/1923 | Dye | 52/258 |
| 1,629,103 | | 5/1927 | Honberger | 428/218 |
| 1,655,676 | | 1/1928 | Daggett | 264/33 |
| 1,706,647 | | 3/1929 | Besser | 249/64 |
| 1,712,678 | | 5/1929 | Redman | 249/16 |
| 1,746,566 | | 2/1930 | Tufts | 405/149 |
| 1,776,438 | | 9/1930 | Kinninger | 249/45 |
| 1,862,544 | | 6/1932 | McWane | 264/33 |
| 2,496,616 | | 2/1950 | Barton | 264/33 |
| 2,523,349 | | 9/1950 | Wissinger | 249/65 |
| 2,548,935 | | 4/1951 | Billner | 264/31 |
| 2,560,980 | | 7/1951 | Pettersen | 425/361 |
| 2,633,621 | | 4/1953 | Moss | 264/34 |
| 2,929,500 | | 3/1960 | Warner | 209/581 |
| 3,142,105 | * | 7/1964 | Weir et al. | 425/62 |
| 3,225,409 | | 12/1965 | Huffaker | 425/209 |
| 3,688,814 | | 9/1972 | Budai et al. | 425/219 |
| 3,956,516 | | 5/1976 | Holt et al. | 426/420 |
| 4,052,031 | | 10/1977 | Melfi | 249/19 |
| 4,106,746 | | 8/1978 | Baculo | 249/216 |
| 4,185,804 | | 1/1980 | Baculo | 249/20 |
| 4,254,532 | | 3/1981 | Hager | 16/20 |
| 4,426,061 | | 1/1984 | Taggart | 249/45 |
| 4,557,681 | * | 12/1985 | Wright et al. | 425/62 |
| 4,640,671 | * | 2/1987 | Wright | 425/361 |
| 4,725,216 | | 2/1988 | Foster | 425/62 |
| 5,021,202 | | 6/1991 | Novotny | 264/33 |
| 5,029,804 | | 7/1991 | McGregor | 249/20 |
| 5,309,451 | | 5/1994 | Noya et al. | 371/40.4 |

APPARATUS FOR FORMING ADOBE BLOCKS

BACKGROUND OF THE INVENTION

Forming adobe blocks by hand is a well known art. The material for the block is heavy textured clay soil. However previous apparatus have not had the power and the facility to produce uniform blocks in both density and dimension. Furthermore these are not suitable for high volume production.

Examples of previous known form of presses similar to the present invention are disclosed in U.S. Pat. Nos. 2,121; 143,806; 266,532; 348,617; 348,702; 435,171; 1,335,071.

SUMMARY OF THE INVENTION

The apparatus of this invention is mounted on a trailer chassis and may be towed to the site of construction.

The material used for the adobe is a heavy textured clay, preferably without any addition of moisture or binder material.

Preferably, the soil is compressed under high pressure and is so dense when ejected from the mould that the adobe block is instantly ready for use and need not be dried first. Since the machine produces uniform blocks dimensionally, it can be used to construct an adobe wall by dampening the upper course of the wall with water, and placing the next course directly on top of this course.

Because of the uniform size of the blocks there is no need to use mortar of any kind to bend the courses together. Preferably, the blocks are designed with a wedge shaped indentation on one face to prevent rocking of one on another when laid to form a wall.

The main objective of this invention is to provide an apparatus which will be capable of forming adobe blocks of uniform dimensions.

Another object of this invention is to provide an apparatus to form various dimensions of blocks by using interchangeable mould cavities.

Yet another object of this invention is to provide an apparatus for forming adobe blocks using readily available clay soil as the base material without the necessity of mixing binder and water with the soil, which is freshly dug before being placed in the apparatus.

A further object of this invention is to provide an apparatus which will be capable of forming adobe blocks in high quantities, and that these blocks can be used instantly without any drying time.

Another object of this invention is to provide an apparatus for forming adobe building blocks which will conform to conventional building practices, be of simple construction, economically feasible and relatively easy to operate.

Another object of the invention is to provide an apparatus that: (a) is self-contained as to everything needed to make adobe blocks, aparty from the actual clay; (b) can be taken, as a self-contained unit, to a building-site, and can be set up there with a minimum of skill and attention; (c) can produce blocks, under real building-site conditions, with a minimum of skill and effort on the part of the operator.

These together with other objects and features will become apparent and are contained in the description of details of the construction and operation as described and claimed hereinafter with references to the accompanying drawings.

DESCRIPTION OF THE ITEMS

Figures 1, 2:
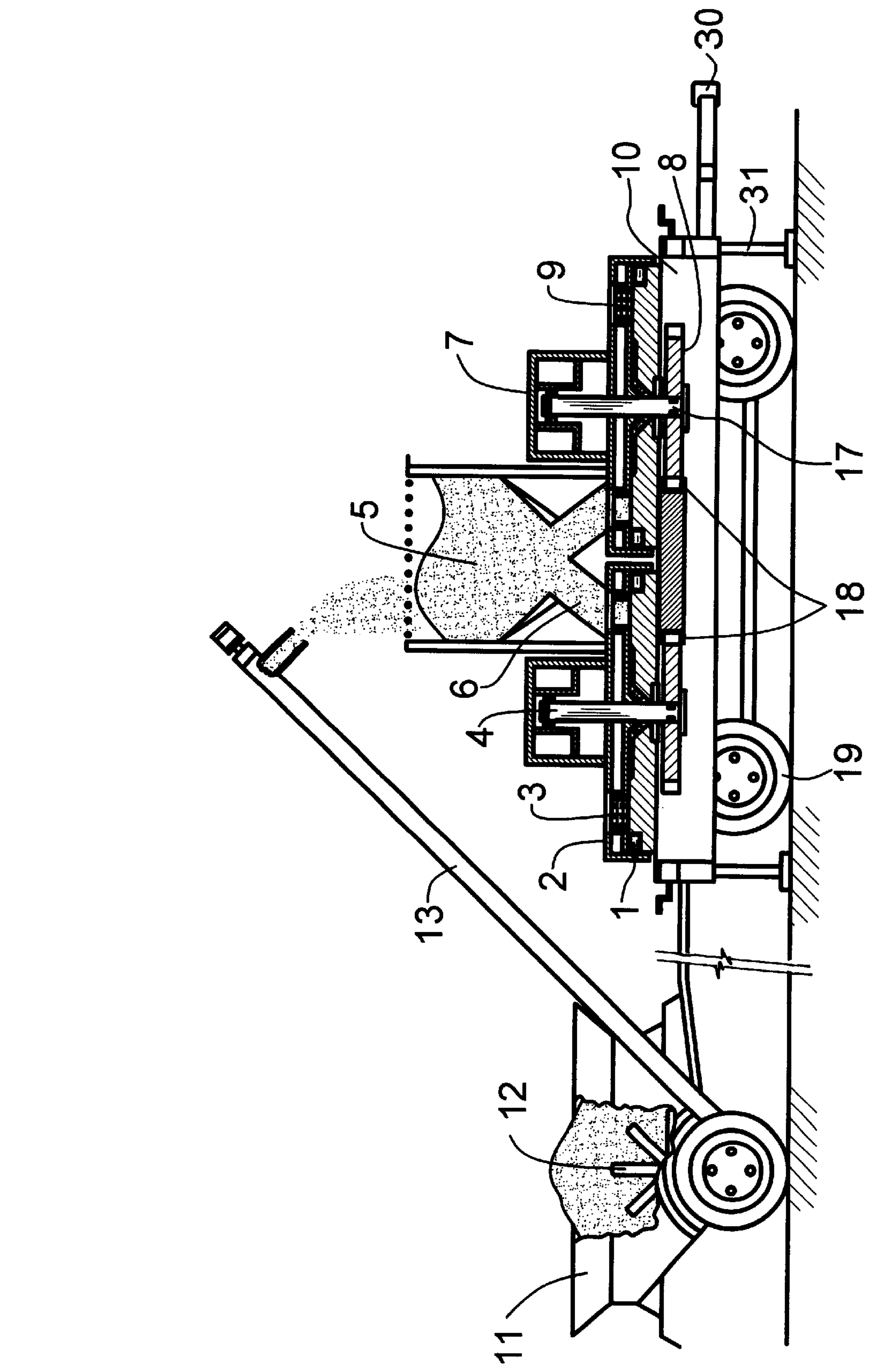
FIG. 1 is a side elevation view of a four wheel trailer mounted form of the instant invention.
FIG. 2 shows the granulator hopper with screw elevator mounted on a two wheel trailer.
Figure 3:
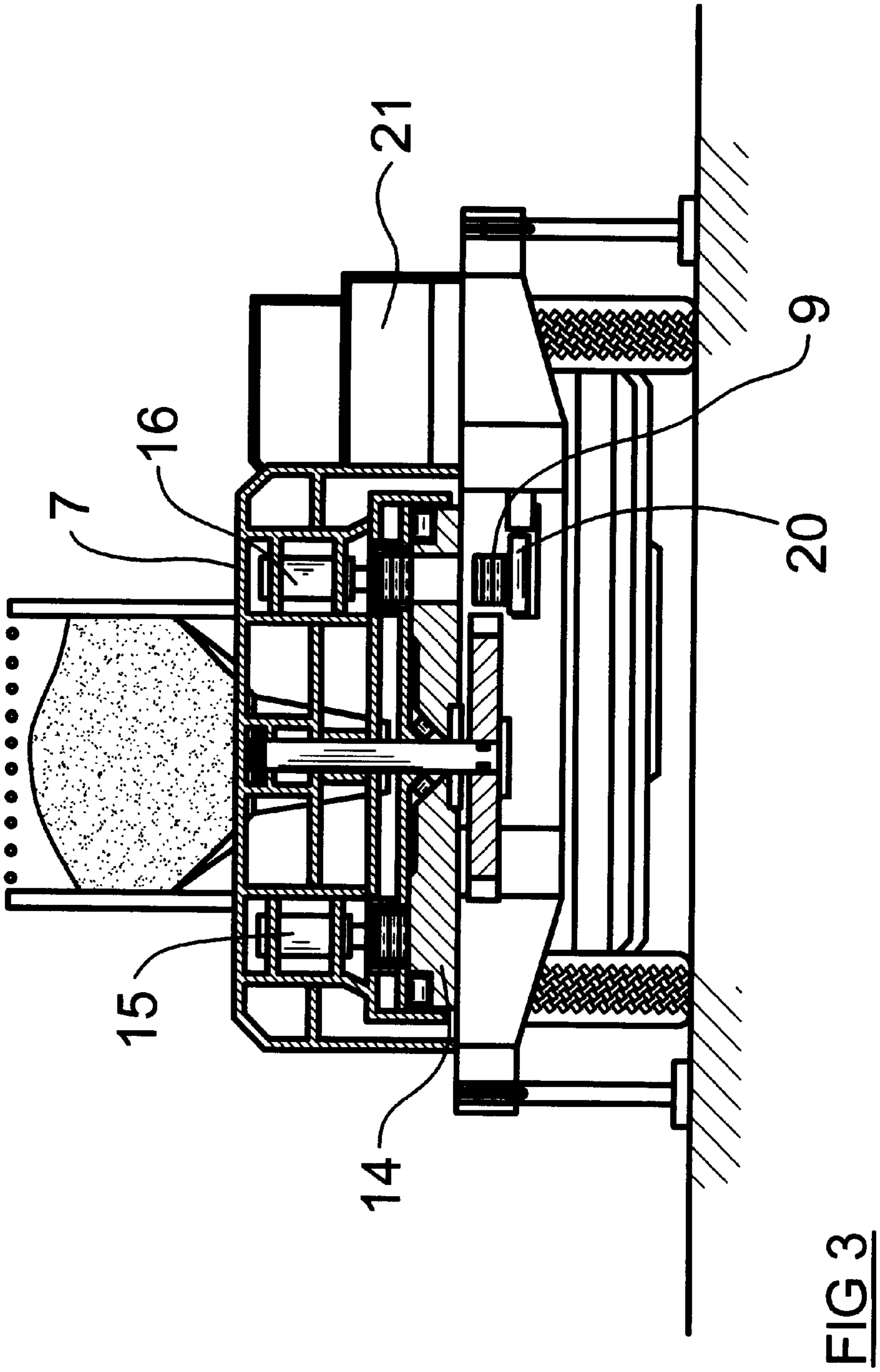
FIG. 3 is a vertical section of the hopper, the bridge, the ramming and ejecting cylinders.
Figure 4:
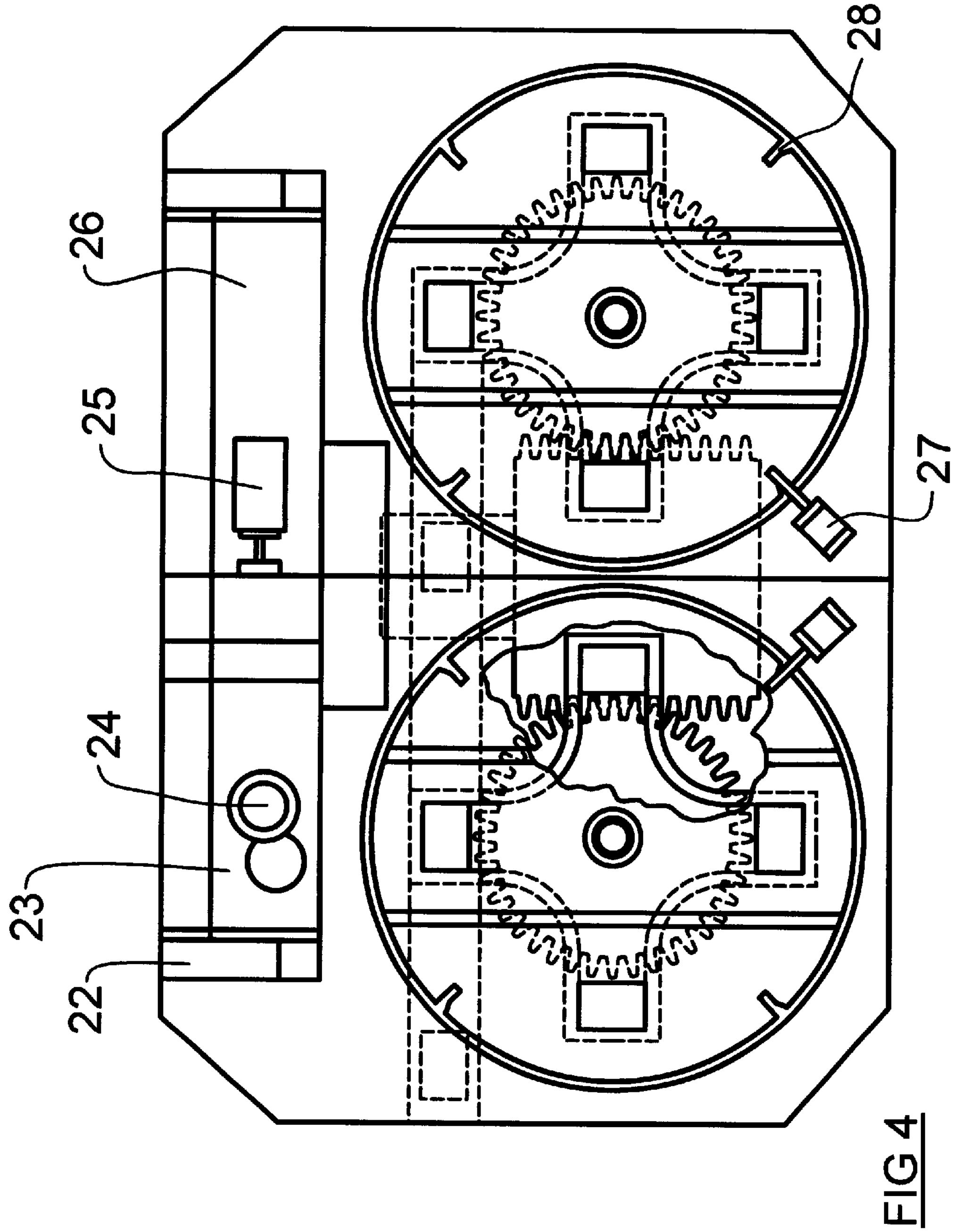
FIG. 4 is a top view of the forming station.
Figure 6:
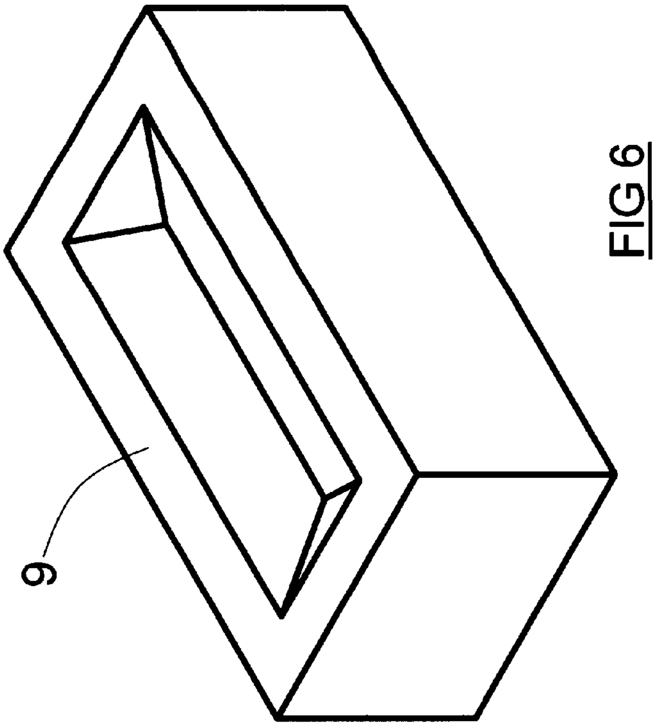
FIG. 6 is a perspective view of an adobe block produced through the apparatus of the invention.
Figure 5:
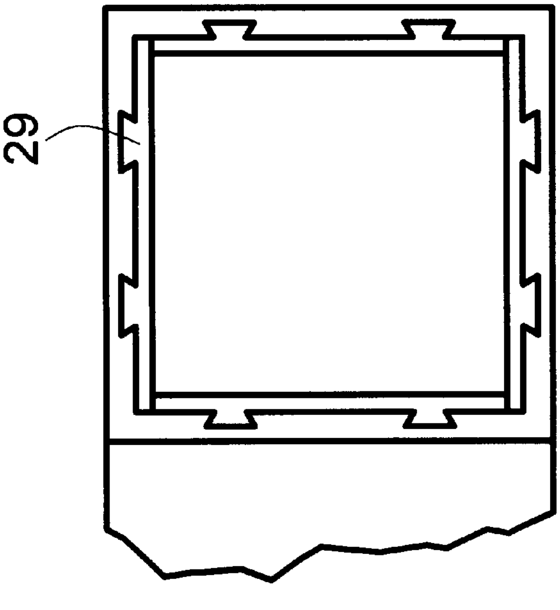
FIG. 5 shows the interchangeable moulds to produce different sizes of blocks.

1. Turntable support bearings
2. Turntables
3. Mould cavities
4. Shafts for turntables
5. Main soil hopper
6. Soil feed tubes
7. Bridge structure
8. Gears for turntables
9. Adobe block
10. Trailer frame
11. Pregranulator
12. Hammer mill
13. Screw conveyor
14. Bed plate
15. Compressing ram
16. Ejecting ram
17. One way clutches
18. Gear racks
19. Steerable front wheels
20. Roller conveyor
21. Diesel fuel tank
22. Diesel motor
23. Hydraulic control valves
24. Hydraulic pump
25. Hydraulic cylinder for racks
26. Hydraulic oil tank
27. Table locking device
28. Table locking slots
29. Interchangeable mould cavities

DETAILED DESCRIPTION OF THE EMBODIMENT

Referring more specifically to the drawing, the numeral 10 designates the trailer frame. The trailer frame is carried by a pair of wheeled axle assemblies of which the front wheels 19 are steerable to facilitate towing. The four corners of the trailer frame 10, are fitted with jacks 31, which are extendible downwards to engage with the ground on which the axle assembly rests, in order to support the trailer frame stationary on the ground. The trailer frame is also equipped with a towing hitch 30.

Mounted on the frame are two heavy bed plates 14, which support the turntable 2.

The turntable 2 carries the mould cavities 3, which are interchangeable for various sizes of block 29. Across the turntable are mounted a pair of bridge type structural members 7, which in turn support the hydraulic cylinders 15, for compressing the soil into blocks, and ram 16, to ejects the compressed adobe block 9.

The ram 16 ejects the block onto a roller conveyor 20, which is mounted on an incline so the blocks will roll out of the apparatus without power. The roller could be driven at will if needed.

The blocks 9 are formed at the same time, as the apparatus has twin turntables 2. The bed plates 14 also house the bearings for the turntable shaft 4 which is supporting the gears 8.

The gears 8 provide the rotary motion for the turntable 2, and ensure the proper indexing of the moulds placed in the turntable.

The gears 8 are divided by a gear rack 18 which is moved by a hydraulic cylinder 25. The rack 18 is double-sided, in order to move both turntables at the same time. (One of the racks 18, can be disconnected at will, and only one turntable will rotate.)

The controlled stroke of the cylinder through the rack 18 will rotate the table 2, 90 degrees at each stroke. At the end of each 90 degree turn, a locking device 27 will secure the table in position. Before the next cycle can start, the locking device has to be withdrawn, which is done by a hydraulic servo cylinder 27.

At each indexing, the mould openings engage, in sequence, with the filling hopper 5 at "Station One", the compressing ram 15 at "Station Two" and the ejecting ram 16 at "Station Four".

The gears 8 driving the turntable 2 are locked to their shaft 4 through a one way clutch 17, to relieve the rack 18 from driving the turntable 2 on the return stroke. The turntables 2 revolve on rollers 1, mounted on respective spring loaded shafts and embedded into the bedplate 14.

The turntable contains four equally spaced notches 28, which engage with the locking device 27 at each 90 degree index turn. The locking device is sprung-engaged into its position, and will be released by hydraulic cylinder 27, before the next indexing cycle.

The bridge 7 supports the hydraulic rams for both the compression 15 and ejecting purposes 16. The compression stroke of the pistons moving the rams downwards, and the rams are returned into the upwardly position before the new cycle can start. The rams are secured against turning to ensure that both the pressure and the ejecting ram are properly engaged with the mould cavities, which can be rectangular or square in shape. The ram assemblies 15 and 16, are angularly displaced 180 degrees apart, about the axis of rotation of the table, and angularly displaced 90 degrees from the soil receiving chamber and the ejecting station.

When the locking device is in position one of the mould cavities is in line with the soil hopper for filling, the second and third cavities 3 are in line with tile compressing ram and the ejecting ram respectively. The trailer frame 10 includes the soil hopper 5, which is mounted centrally on the trailer and serves both turntables (or just one, if desired). The hopper 5 is fed, by a screw conveyor 13, with pre-granulated soil. The screw conveyor may be driven by the same power unit as the main apparatus, hydraulically or by any other means.

Under the ejecting rams 16 is a roller or belt conveyor 20, supported on the trailer frame 10, projecting outwardly on the rear of the trailer. The conveyor 20 receives the adobe block 9 from the ejecting ram 16, and displaces it at the other end of the trailer.

In operation, freshly dug soil is dumped into the hopper 11. The hammer mill 12 breaks the soil into uniform granulate, and the screw conveyor 13 will then move the granulate to the main hopper 5, to feed the mould cavities as required. The soil falls by gravity down into the mould cavity 3, registered under the feed tubes 6. The moulds are open at the top, and are closed at the bottom by the stationary horizontal bed plate 14.

When the mould cavity 3, registered with the filling tubes 6 has been filled with soil, the rotary tables 2 are indexed angularly 90 degrees to move the mould into the position of the compressing ram 15, and to rotate the next empty mould under the filling tubes 6, for receiving soil.

As the first mould registers with the ram 15, the locking device 27 secures the table in position and the hydraulic ram is actuated to compress the soil into a hard adobe block. The pressure exerted by the ram 15 is adjustable to compress the freshly dug heavy textured clay soil into a hard adobe block without mixing the soil with a binder material or the addition of moisture. The process is then repeated and the table 2 is again angularly displaced 90 degrees to position the first soil-filled mould which now contains the vertically compressed adobe block 9 into registry with the ejecting ram 16. At this instant the ram 16 is actuated to displace the adobe block 9 onto the conveyor to discharge the block at the end of the trailer. The rams 15 and 16 are operated at the same time.

The bed plate 14, which lies under the moulds, is circular to retain the soil in the freshly filled mould and the compressed block until that mould is registered with the electing ram 16. There is an opening in the bed plate 14, under the ejecting ram 16, to allow the discharge of the compressed adobe block 9, onto the conveyor.

The ram will form the blocks with a wedge shaped indentation on one side 9. This will ensure that the compressing force will spread the soil in all directions into the mould.

As soon as the adobe block is discharged from the conveyor 20, it is ready to use in the building process. With the use of the apparatus as depicted, the operator only has two tasks: first, to place soil into the pre-granulator, and second, to assemble the adobe bricks into a wall.

The blocks should be laid with the wedge shaped indentation facing down. After a course of adobe has been laid, the upper flat surfaces of the blocks may be sprayed with water, so as to be slightly moistened when the next course of blocks 9 is placed on it. Placing the hollow side of the blocks on the wet face of the previously laid course will greatly reduce rocking of the blocks on each other.

There is no need for the blocks 9 to be air dried after having been formed. When laying an adobe wall, consecutive blocks 9 are laid end to end in order to form the first course of the wall. The upper surfaces of the laid course of blocks are dampened with water and the next course of blocks are immediately applied on top of it. The moistening of the blocks forms a bond with the next layer of blocks and is sufficient to retain the course of blocks 9 in position relative to each other. The high pressure applied for the forming of the building block 9 will provide means to use freshly dug soil as a building material produced at mass production rates.

The 90 degree cycle has the following characteristics. First: soil receiving station; second: pressure ram to compress the soil; third: non-active; and fourth: the ejecting ram. The mould cavities are successively registrable when the mould is receiving soil and is engaged with the hopper 5, via feed tube 6. The pressure ram and the ejecting ram are also in their proper position. The rams are positively guided into their respective cavities, which can be rectangular or square as required for the block. The apparatus includes twin turn-tables; therefore, at each cycle, two blocks are produced. A preferred aspect is the pre-granulator unit, which is combined with the screw conveyor. It is most important that the mould cavities are filled uniformly with soil to be able to produce consistently high-quality building blocks. The heavy frame trailer supports both the bridge and the bed plate, the bridge mounted hydraulic rams diametrically opposite to each other ensuring the rigidity of the system. The heavy bed plate together with the bridge provide and enclosed frame structure, which is important for a hydraulically operated bricketing press.

The embodiment of the invention as depicted can be summarised as follows. A rotating carrousel having four mould cavities equally spaced at ninety degrees from each other. The moulds are open vertically to the sky and in the opposite direction. The mould cavities are on the same pitch circle from the center of the axis. The rotary table is positively locked at each ninety degree turn. When the table is locked in position each station is in its position. The hopper containing pre-granulated soil is mounted stationary above the number one station. The hopper is fed by a screw conveyor from a hammer mill which breaks up the dug-out soil into a uniform granulate. This is most important for the manufacture of high quality adobe bricks. When the hopper has filled the mould cavity the carousel is turned ninety degrees and the filling process is repeated. At the same time the ram at number two station compresses the soil into a high density adobe block. On a further ninety degree turn both operations are repeated, and at the same time a hydraulically operated ram ejects the completed adobe block. The carousel is mounted on a heavy frame suitable to sustain the hydraulic forces of the compression and ejecting rams.

What is claimed is:

1. Apparatus for making adobe blocks, wherein:

the apparatus comprises a trailer;

the trailer is self-contained;

the trailer is wheeled, and mobile, and is of a size and nature such that it can be towed on roads, and can be manoeuvred about a building site;

the trailer includes, as an on-board fixture mounted on the frame of the trailer, a hopper;

the trailer includes, as an on-board fixture mounted on the frame of the trailer, a means for conveying prepared granules of soil to the hopper, being soil of a kind suitable for compression into adobe blocks;

the trailer includes, as an on-board fixture mounted on the frame of the trailer, a turn-table carousel;

the trailer includes, as an on-board fixture mounted on the frame of the trailer, a guiding means for guiding the carousel for rotation about an axis in the frame of the trailer;

the carousel is so structured as to be rotatable to and between at least first, second, and third orientations thereof;

the apparatus includes at least one mould, which is integral with the carousel;

the trailer includes, as an on-board fixture mounted on the frame of the trailer, an operable compression ram;

the trailer includes, as an on-board fixture mounted on the frame of the trailer, an operable ejection means;

in the first orientation of the carousel, the mould is aligned with the hopper in such manner as to receive granules of soil falling under gravity into the mould from the hopper;

in the second orientation of the carousel, the mould is aligned with the compression ram, which is effective, when operated, to compress granules of soil within the mould;

in the third orientation of the carousel, the mould is aligned with the operable ejection means, which is effective, when operated, to discharge compressed blocks out of the mould and away from the trailer;

the trailer includes, as an on-board fixture mounted on the frame of the trailer, an operable indexing means, which is effective, when operated, to index the carousel rotationally between the said orientations;

the trailer includes, as an on-board fixture mounted on the frame of the trailer, a power source means, for powering the said operable means;

the trailer includes, as an on-board fixture mounted on the frame of the trailer, a means for timing the several operable means sequentially in correspondence with the orientations of the carousel;

the operable indexing means comprises a rack and an operable hydraulic ram for driving the rack, a meshing pinion on the carousel, and an operable stop-means for stopping and holding the carousel at the said orientations.

2. Apparatus of claim 1, wherein the said operable means are operable hydraulically, and the power source means includes a means for generating hydraulic pressure.

3. Apparatus of claim 1, wherein the trailer frame includes a solid heavy bed-plate, and the guide means includes bearings carried in the bed-plate.

4. Apparatus of claim 1, wherein the power source means includes, as an on-board fixture mounted on the frame of the trailer, a liquid-fuel-powered motor and a fuel tank.

5. Apparatus for making adobe blocks, wherein:

the apparatus comprises a trailer;

the trailer is self-contained;

the trailer is wheeled, and mobile, and is of a size and nature such that it can be towed on roads, and can be manoeuvred about a building site;

the trailer includes, as an on-board fixture mounted on the frame of the trailer, a hopper;

the trailer includes, as an on-board fixture mounted on the frame of the trailer, a means for conveying prepared granules of soil to the hopper, being soil of a kind suitable for compression into adobe blocks;

the trailer includes, as an on-board fixture mounted on the frame of the trailer, a turn-table carousel;

the trailer includes, as an on-board fixture mounted on the frame of the trailer, a guiding means for guiding the carousel for rotation about an axis in the frame of the trailer;

the carousel is so structured as to be rotatable to and between at least first, second, and third orientations thereof;

the apparatus includes at least one mould, which is integral with the carousel;

the trailer includes, as an on-board fixture mounted on the frame of the trailer, an operable compression ram;

the trailer includes, as an on-board fixture mounted on the frame of the trailer, an operable ejection means;

in the first orientation of the carousel, the mould is aligned with the hopper in such manner as to receive granules of soil falling under gravity into the mould from the hopper;

in the second orientation of the carousel, the mould is aligned with the compression ram, which is effective, when operated, to compress granules of soil within the mould;

in the third orientation of the carousel, the mould is aligned with the operable ejection means, which is effective, when operated, to discharge compressed blocks out of the mould and away from the trailer;

the trailer includes, as an on-board fixture mounted on the frame of the trailer, an operable indexing means, which is effective, when operated, to index the carousel rotationally between the said orientations;

the trailer includes, as an on-board fixture mounted on the frame of the trailer, a power source means, for powering the said operable means;

the trailer includes, as an on-board fixture mounted on the frame of the trailer, a means for timing the several operable means sequentially in correspondence with the orientations of the carousel;

the apparatus includes a receptacle for receiving raw soil;

the apparatus includes a granulator means located in the receptacle for preparing the raw soil as granules;

and the apparatus includes a conveyor for conveying the granules of soil to the hopper.

6. Apparatus of claim 5, wherein the receptacle, the granulator means, and the conveyor, are included as components of a subsidiary wheeled accessory, which includes a means for hitching the accessory to the trailer.

7. Apparatus of claim 5, wherein the trailer is arranged with the carousel in a basically horizontal configuration, for rotation about a vertical axis;

the trailer includes, as an on-board fixture mounted on the frame of the trailer, a bridge structure;

the bridge structure carries the compression ram above the mould, and the compression ram, when operated, exerts a compression force downwards into the soil in the mould.

8. Apparatus of claim 7, wherein the ejection means comprises a hydraulic discharge ram, and the bridge structure carries the discharge ram above the mould, and the discharge ram, when operated, presses block downwards through the floor of the mould.

9. Apparatus for making adobe blocks, wherein:

the apparatus comprises a trailer;

the trailer is self-contained;

the trailer is wheeled, and mobile, and is of a size and nature such that it can be towed on roads, and can be manoeuvred about a building site;

the trailer includes, as an on-board fixture mounted on the frame of the trailer, a hopper;

the trailer includes, as an on-board fixture mounted on the frame of the trailer, a means for conveying prepared granules of soil to the hopper, being soil of a kind suitable for compression into adobe blocks;

the trailer includes, as an on-board fixture mounted on the frame of the trailer, a turn-table carousel;

the trailer includes, as an on-board fixture mounted on the frame of the trailer, a guiding means for guiding the carousel for rotation about an axis in the frame of the trailer;

the carousel is so structured as to be rotatable to and between at least first, second, and third orientations thereof;

the apparatus includes at least one mould, which is integral with the carousel;

the trailer includes, as an on-board fixture mounted on the frame of the trailer, an operable compression ram;

the trailer includes, as an on-board fixture mounted on the frame of the trailer, an operable ejection means;

in the first orientation of the carousel, the mould is aligned with the hopper in such manner as to receive granules of soil falling under gravity into the mould from the hopper;

in the second orientation of the carousel, the mould is aligned with the compression ram, which is effective, when operated, to compress granules of soil within the mould;

in the third orientation of the carousel, the mould is aligned with the operable ejection means, which is effective, when operated, to discharge compressed blocks out of the mould and away from the trailer;

the trailer includes, as an on-board fixture mounted on the frame of the trailer, an operable indexing means, which is effective, when operated, to index the carousel rotationally between the said orientations;

the trailer includes, as an on-board fixture mounted on the frame of the trailer, a power source means, for powering the said operable means;

the trailer includes, as an on-board fixture mounted on the frame of the trailer, a means for timing the several operable means sequentially in correspondence with the orientations of the carousel;

the trailer includes, as an on-board fixture mounted on the frame of the trailer, a second carousel;

the two carousels include respective pinions;

the operable indexing means comprises a rack, and ram for driving the rack;

the rack is arranged to mesh with both pinions simultaneously;

and the indexing means is effective to index both carousels in unison.

10. Apparatus of claim 9, wherein the carousels each carry four respective moulds.

11. Apparatus of claim 9, wherein the or each mould is formed in a respective mould-inserts, and the apparatus includes means for removably attaching the mould-inserts to the carousel, whereby the mould-inserts can be interchanged.

12. Apparatus for making adobe blocks, wherein:

the apparatus comprises a trailer;

the trailer is self-contained;

the trailer is wheeled, and mobile, and is of a size and nature such that it can be towed on roads, and can be manoeuvred about a building site;

the trailer includes, as an on-board fixture mounted on the frame of the trailer, a hopper;

the trailer includes, as an on-board fixture mounted on the frame of the trailer, a means for conveying prepared granules of soil to the hopper, being soil of a kind suitable for compression into adobe blocks;

the trailer includes, as an on-board fixture mounted on the frame of the trailer, a turn-table carousel;

the trailer includes, as an on-board fixture mounted on the frame of the trailer, a guiding means for guiding the carousel for rotation about an axis in the frame of the trailer;

the carousel is so structured as to be rotatable to and between at least first, second, and third orientations thereof;

the apparatus includes at least one mould, which is integral with the carousel;

the trailer includes, as an on-board fixture mounted on the frame of the trailer, an operable compression ram;

the trailer includes, as an on-board fixture mounted on the frame of the trailer, an operable ejection means;

in the first orientation of the carousel, the mould is aligned with the hopper in such manner as to receive granules of soil falling under gravity into the mould from the hopper;

in the second orientation of the carousel, the mould is aligned with the compression ram, which is effective, when operated, to compress granules of soil within the mould;

in the third orientation of the carousel, the mould is aligned with the operable ejection means, which is effective, when operated, to discharge compressed blocks out of the mould and away from the trailer;

the trailer includes, as an on-board fixture mounted on the frame of the trailer, an operable indexing means, which is effective, when operated, to index the carousel rotationally between the said orientations;

the trailer includes, as an on-board fixture mounted on the frame of the trailer, a power source means, for powering the said operable means;

the trailer includes, as an on-board fixture mounted on the frame of the trailer, a means for timing the several operable means sequentially in correspondence with the orientations of the carousel;

the said operable means are operable hydraulically, and the power source means includes a means for generating hydraulic pressure;

the trailer frame includes a solid heavy bed-plate, and the guide means includes bearings carried in the bed-plate;

the operable indexing means comprises a rack and an operable hydraulic ram for driving the rack, a meshing pinion on the carousel, and an operable stop-means for stopping and holding the carousel at the said orientations;

the power source means includes, as an on-board fixture mounted on the frame of the trailer, a liquid-fuel-powered motor and a fuel tank;

the apparatus includes a receptacle for receiving raw soil;

the apparatus includes a granulator means located in the receptacle for preparing the raw soil as granules;

and the apparatus includes a conveyor for conveying the granules of soil to the hopper;

the receptacle, the granulator means, and the conveyor, are included as components of a subsidiary wheeled accessory, which includes a means for hitching the accessory to the trailer;

the trailer is arranged with the carousel in a basically horizontal configuration, for rotation about a vertical axis;

the trailer includes, as an on-board fixture mounted on the frame of the trailer, a bridge structure;

the bridge structure carries the compression ram above the mould, and the compression ram, when operated, exerts a compression force downwards into the soil in the mould;

the ejection means comprises a hydraulic discharge ram, and the bridge structure carries the discharge ram above the mould, and the discharge ram, when operated, presses block downwards through the floor of the mould;

the trailer includes, as an on-board fixture mounted on the frame of the trailer, a second carousel;

the two carousels include respective pinions;

the rack is arranged to mesh with both pinions simultaneously;

and the indexing means is effective to index both carousels in unison;

the carousels each carry four respective moulds;

and the or each mould is formed in a respective mould-inserts, and the apparatus includes means for removably attaching the mould-inserts to the carousel, whereby the mould-inserts can be interchanged.

* * * * *